US008248652B2

(12) United States Patent
Wardell et al.

(10) Patent No.: US 8,248,652 B2
(45) Date of Patent: Aug. 21, 2012

(54) N-UP SHEETLET BASED IMAGING WITH FLEXIBLE FORMATTING OF LOGICAL PAGES (75) Inventors: Glenn Wardell, Fort Collins, CO (US); David E. Stone, Longmont, CO (US); Reinhard H. Hohensee, Boulder, CO (US); Jamsie Treppendahl, Boulder, CO (US)

(73) Assignee: Ricoh Productions Print Solutions LLC, Boulder, CO (US)

( * ) Notice: Subject to any disclaimer, the term of this patent is extended or adjusted under 35 U.S.C. 154(b) by 1055 days.

(21) Appl. No.: 12/134,468

(22) Filed: Jun. 6, 2008

(65) Prior Publication Data

US 2009/0303513 A1    Dec. 10, 2009

(51) Int. Cl.
*G06K 15/02*    (2006.01)
*H04N 1/387*    (2006.01)
(52) U.S. Cl. ........................................ 358/1.18; 382/295
(58) Field of Classification Search .................... 358/1.9, 358/1.18, 537, 538, 540, 450, 452, 453; 382/384, 382/294–297; 715/204, 234, 244, 246, 253; 345/629–641
See application file for complete search history.

(56) References Cited

U.S. PATENT DOCUMENTS

| 5,495,561 | A | 2/1996 | Holt | |
| 6,088,708 | A * | 7/2000 | Burch et al. | 715/229 |
| 6,175,423 | B1 | 1/2001 | Frickey | |
| 6,519,046 | B1 * | 2/2003 | Kinjo | 358/1.1 |
| 6,631,007 | B1 | 10/2003 | Buis et al. | |
| 7,268,910 | B2 * | 9/2007 | Catt et al. | 358/1.18 |
| 2002/0181021 | A1 | 12/2002 | Stephens | |
| 2004/0047002 | A1 | 3/2004 | Nishi | |
| 2004/0150853 | A1 | 8/2004 | Stodersching et al. | |
| 2004/0205603 | A1 | 10/2004 | Nguyen et al. | |
| 2005/0270581 | A1 * | 12/2005 | Yamakado et al. | 358/1.18 |
| 2006/0044604 | A1 | 3/2006 | Mirmotahari | |
| 2006/0072174 | A1 * | 4/2006 | Koike et al. | 358/537 |
| 2006/0150091 | A1 * | 7/2006 | Suzuki et al. | 715/517 |
| 2007/0070374 | A1 | 3/2007 | Boyes, Jr. et al. | |
| 2007/0091372 | A1 | 4/2007 | Matsuki | |
| 2007/0253020 | A1 * | 11/2007 | Hull et al. | 358/1.15 |

FOREIGN PATENT DOCUMENTS

EP    1031916 A1    8/2000
WO    WO 2007031433 A1    3/2007

* cited by examiner

*Primary Examiner* — Scott A Rogers
(74) *Attorney, Agent, or Firm* — Duft Bornsen & Fishman, LLP (57) ABSTRACT Methods and systems herein provide for flexible formatting of print jobs and their associated logical pages. One N-up printing system is adapted to receive a print job from a host system for printing to a tangible medium. The print job includes at least a first logical page. The printing system includes an N-up formatter interface adapted to receive formatting parameters. The printing system also includes an N-up formatter that is communicatively coupled to the N-up formatter interface. The N-up formatter is adapted to generate a first page inclusion object based on the formatting parameters. The N-up formatter is further adapted to input the first logical page to the first page inclusion object and position the first logical page within the first page inclusion object.

25 Claims, 7 Drawing Sheets

N-UP SHEETLET BASED IMAGING WITH FLEXIBLE FORMATTING OF LOGICAL PAGES

BACKGROUND OF THE INVENTION

1. Field of the Invention

The invention relates to the field of printing systems, and in particular, to methods and systems for N-up print imaging with flexible positioning, sizing, and rotation of logical pages.

2. Statement of the Problem

Printing systems associated with data processing enterprises generally include a localized printer controller within the printing system. The printer controller controls the overall operation of the printing system including host interfacing, page description language interpretation and rasterization, and lower level process control or interface features of the printing engine associated with the printing system. Host interaction may include appropriate adapters for coupling the printing system to one or more host systems utilizing one or more communication media and one or more communication protocols. Print jobs (often referred to as "raw print jobs") are received by the printing system from one or more attached host computer systems. The raw print jobs are generally encoded in the form of a page description language such as PostScript, HP PCL, etc. In addition, raw print jobs may be encoded as simple character streams (ASCII or EBCDIC) with no page description formatting associated therewith. Still further, any single job may be encoded using multiple page description languages or encodings. For example, a banner page may be encoded in simple ASCII characters, various other pages of the same job may be encoded as PostScript and some pages may include PCL encoded material— all within a single print job. In whatever form the raw print job may be encoded or formatted, the printer controller within the printing system interprets the received information to generate rasterized images of pages represented by the raw print job. Each rasterized page image generally comprises a 2-dimensional array of picture elements ("pixels") that represent a corresponding formatted page of the received raw print job. Each pixel may represent an encoded color value in accordance with the requirements of the particular raw print job encoding and the capabilities of the printing system on which the print job is to be printed. The process of interpreting the raw print job to generate corresponding rasterized page images is typically referred to as "ripping" or "rasterizing" and the sequences of rasterized pages may be referred to herein as a "ripped print job" or a "rasterized print job".

The printer controller may store or buffer one or more ripped print jobs in accordance with storage capabilities of the particular architecture of a particular printer controller. Each ripped print job comprises one or more rasterized images, each referred to as a "logical page" of the ripped print job. The printer controller may then apply the logical pages to a print engine (sometimes also referred to as an "imaging engine" or as a "marking engine"). The print engine then interacts with the imaging process to mark the printable medium (e.g., the sheet of paper) with the logical pages provided by the printer controller. For example, where the print engine is an electrophotographic imaging engine (e.g., a laser print engine), a laser or other optical imaging system transfers each logical page rasterized image to corresponding pixels on paper formed as particles of toner electrostatically transferred to the paper.

As is generally known in the art, the host system may encode or format the raw print job to present rasterized logical pages in accordance with a number of print parameters. Print parameters may be associated with the particular print engine or printing system and/or may be associated with the raw print job as specified by the host systems. One common formatting technique used in host systems and by printer controllers is to print multiple logical pages on a single sheet of printable medium. Multiple logical pages may be applied to opposing sheet sides of the printable medium (often referred to as duplex or two-sided printing) and/or multiple logical pages may be applied to the same sheet side of the printable medium (often referred to as N-up printing).

Where a host system defines a print job as using such duplex and/or N-up formatting of logical pages, some present print controllers are not adapted to modify this formatting parameter. Rather, the printer controller generally applies the logical pages to the printable medium exactly as the host system requested and regardless of the particular environment of the print engine and printing system. Some present day printing systems include a printer controller adapted to reformat a host-supplied raw print job to change the N-up printing parameter. For example, a 1-up raw print job may be reformatted by such a printer controller of the printing system to print the job as an N-up print job based on printing parameters known to the printing system. Such printing parameters may include, for example, dimensions of the printable medium. By way of example, a host system may format a 1-up raw print job comprising multiple 8.5"×11" (letter size) pages and transfer the raw print job to a printing system having continuous feed 19 inch wide paper. The printing system may then determine that the raw print job may be most efficiently printed as a 2-up print job with two letter size logical pages printed side by side on the 19 inch wide printable medium.

Even with the improved capability of converting 1-up raw print jobs to 2-up print jobs, these printing systems lack the flexibility desired by printing system operators. For example, the printing system may receive print jobs from a variety of host systems. Each of these print jobs may have different dimensions and configurations, such as print jobs for books and print jobs for coupon booklets. However, these uniquely dimensioned print jobs may not require the full width of a continuous feed. A problem exists because present printing systems cannot flexibly position logical pages of print jobs prior to printing on a sheet of paper. Accordingly, continuous feed paper is cut according to the print job. A uniform continuous feed may be used, but such may result in excessive waste of paper due to cutting.

SUMMARY OF THE SOLUTION

Embodiments of the invention solve the above and other related problems with methods and associated systems by providing flexible formatting for print jobs in a print controller. At a user interface, a printing system operator may input parameters that direct a printer controller to position, size, rotate and/or otherwise manipulate logical pages of a print job. These input parameters may also direct the printer controller to generate page inclusion objects, or "sheetlets", that may be used to contain the logical pages of the print job prior to printing on a sheet of tangible medium. The logical pages may be positioned, sized, and/or rotated within the page inclusion objects. Similarly, the page inclusion objects themselves may also be positioned, sized, and/or rotated with respect to the sheet of tangible medium. The page inclusion objects may also allow logical pages to be associated with one another. For example, one logical page to be printed on a first sheet side of the sheet of tangible medium may be linked to a second logical page to be duplex printed on the second sheet side of the sheet of tangible medium. This linkage of the two pages may cause the pages to print at corresponding locations on their respective sheet sides.

In one embodiment, an N-up printing system is adapted to receive a print job from a host system for printing to a tangible medium. The print job includes at least a first logical page. The printing system includes an N-up formatter interface adapted to receive formatting parameters. The printing system also includes an N-up formatter that is communicatively coupled to the N-up formatter interface. The N-up formatter is adapted to generate a first page inclusion object based on the formatting parameters. The N-up formatter is further adapted to input the first logical page to the first page inclusion object and position the first logical page within the first page inclusion object.

In another embodiment, a method that is operable within a printer controller associated with at least one print engine for printing N-up print jobs includes receiving a print job that comprises a first logical page and rasterizing the print job for printing on a first sheet side of a tangible medium. The method also includes receiving formatting parameters to generate a first page inclusion object in response to rasterizing, wherein the first page inclusion object is adapted to digitally include one or more logical pages and generating the first page inclusion object based on the received formatting parameters. The method also includes positioning the first logical page within the first page inclusion object and printing the print job with the first page inclusion object on the first sheet side of the tangible medium.

The invention may include other exemplary embodiments described below.

DESCRIPTION OF THE DRAWINGS

The same reference number represents the same element or the same type of element on all drawings.

DETAILED DESCRIPTION OF THE INVENTION

FIGS. 1-5 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
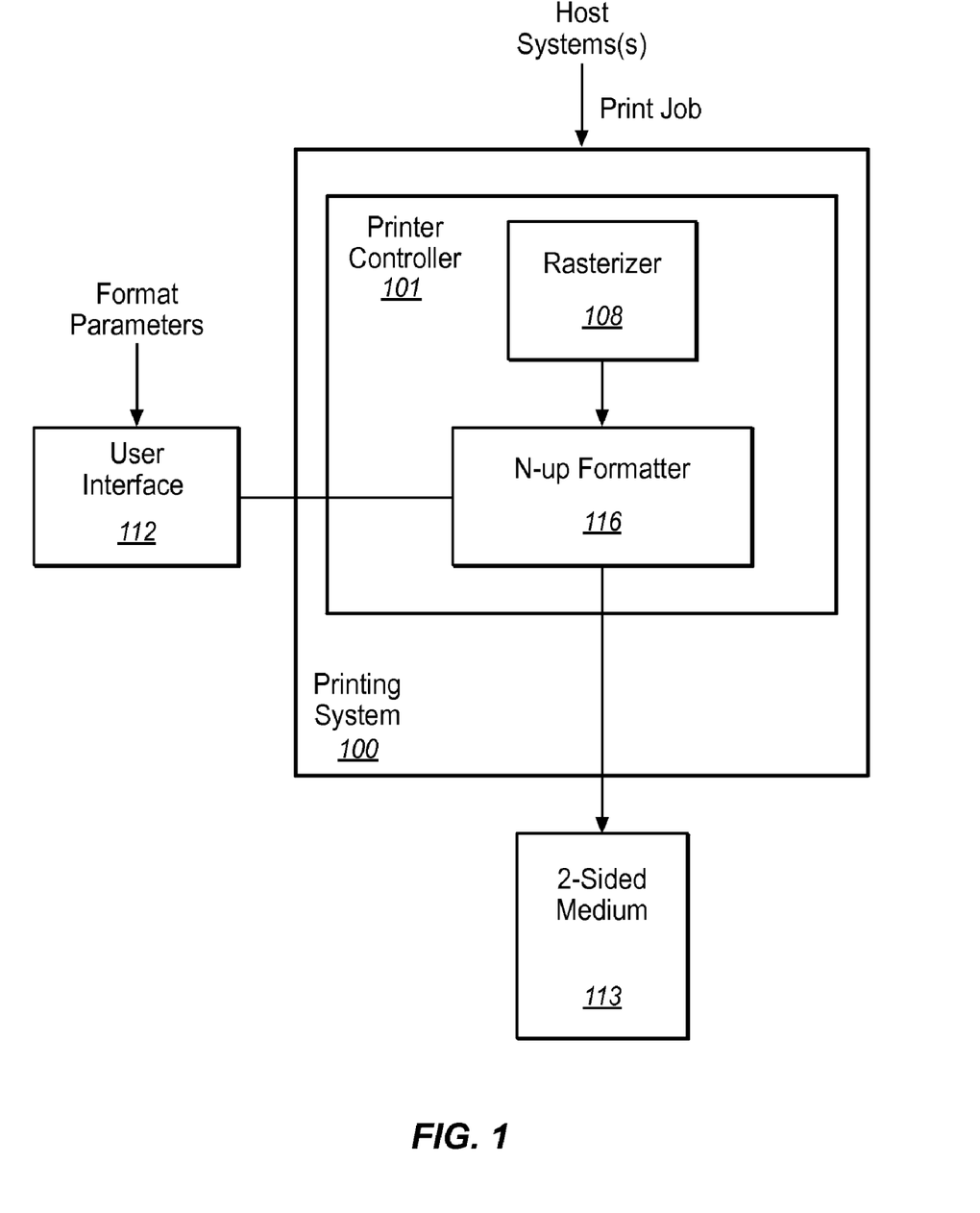
FIG. 1 is a block diagram of a printing system that provides enhanced N-up printing via page inclusion objects in one exemplary embodiment of the invention.

FIG. 1 is a block diagram of a printing system 100 that provides enhanced N-up printing via page inclusion objects in one exemplary embodiment of the invention. The printing system 100 receives print jobs from one or more host systems that are communicatively coupled to the printing system 100. The print jobs include one or more logical pages that are defined by a user of the printing system 100. A logical page generally includes a collection of data such as images and text that the user regards as a printable page. Some examples of such include pages of books, checks, coupons, tickets, and labels. Thus, when a host system user wishes to generate a print job for printing on a two-sided medium 113, the user may configure one or more logical pages for printing on one or both sides of the two-sided medium 113.

To prepare the print job for printing on the two-sided medium 113, the printing system 100 includes a printer controller 101 that receives the print job and rasterizes the print job via rasterizer 108. Rasterization generally regards the conversion of an image described in a vector graphics format into a raster image of pixels such as a bitmap for output to a video display or printer. The rasterized print job and its associated logical pages are then transferred to the N-up formatter 116 to format the print job for printing on the two-sided medium 113. Examples of a two-sided medium 113 include paper, transparent film, and any other type of material capable of being imprinted.

The N-up formatter 116 includes a user interface 112 that allows a user to format the print job by generating a page inclusion object that is used to contain the logical page of the print job. In doing so, the N-up formatter 116 may position the logical page within the page inclusion object based on format parameters input to the N-up formatter 116 via the user interface 112. These format parameters may define rotation, sizing, and/or location of the logical page within the page inclusion object. For example, a user may wish to configure multiple logical pages within the page inclusion object. The user may then input a first logical page within the page inclusion object. The format parameters may allow the user to adjust the size and location of the first logical page within the page inclusion object such that a subsequent logical page does not overlap. Alternatively, the user may input format parameters that direct the N-up formatter 116 to position the logical pages such that they overlap one another within the page inclusion object. Examples of such overlays include digital "watermarks". With the logical pages configured within the page inclusion object, the N-up formatter 116 may transfer the print job with the page inclusion object to a printer for printing on a sheet side of the two-sided medium 113.

The N-up formatter 116 is not intended to be limited to simply adjusting the rotation, size, and/or position of logical pages within a page inclusion object. Rather, the user may also control the N-up formatter 116 to adjust the size, location, and/or rotation of the page inclusion object with respect to the two-sided medium 113. For example, the user may desire to position the page inclusion object at a certain location and angle of rotation on a physical sheet of paper. By inputting format parameters, the user can direct the N-up formatter 116 to position the page inclusion object at a desired position relative to the sheet of paper. The N-up formatter 116 may also be used to generate multiple page inclusion objects with each page inclusion object containing one or more logical pages. For example, the N-up formatter 116 may generate one or more page inclusion objects for each sheet side of the two-sided medium 113. Sizing, positioning, and rotation of logical pages and/or page inclusion objects are described in greater detail below in FIGS. 3 and 4.

Although shown and described with respect to the printer controller 101 having a rasterizer 108 and an N-up formatter 116, those skilled in the art should readily recognize that the invention is not intended to be so limited. The printer controller 101 may include other modules that are adapted to perform the various functions associated with the printer control. Examples of such are shown and described in FIG. 2. Also, those skilled in the art should also readily recognize that the printer controller 101 may be implemented in software, hardware, firmware, or a combination thereof to perform the various functions associated with the printer controller 101 including the novel aspects of page inclusion objects and logical page positioning as described herein.

Additionally, the various positioning aspects of the page inclusion objects may be performed in other devices. For example, the embodiment of FIG. 1 is the page inclusion objects being generated with the N-up formatter 116. Another embodiment, however, such as that disclosed in FIG. 7, may have the page inclusion objects virtually generated by a host computer system. In this regard, a user of the host computer system may generate a print job and input formatting parameters associated with the print job that are used by the printing system to generate the page inclusion objects and configure the logical pages therein. The user may input the formatting parameters to the printing system using the associated page description language of the printing system.

Figure 2:
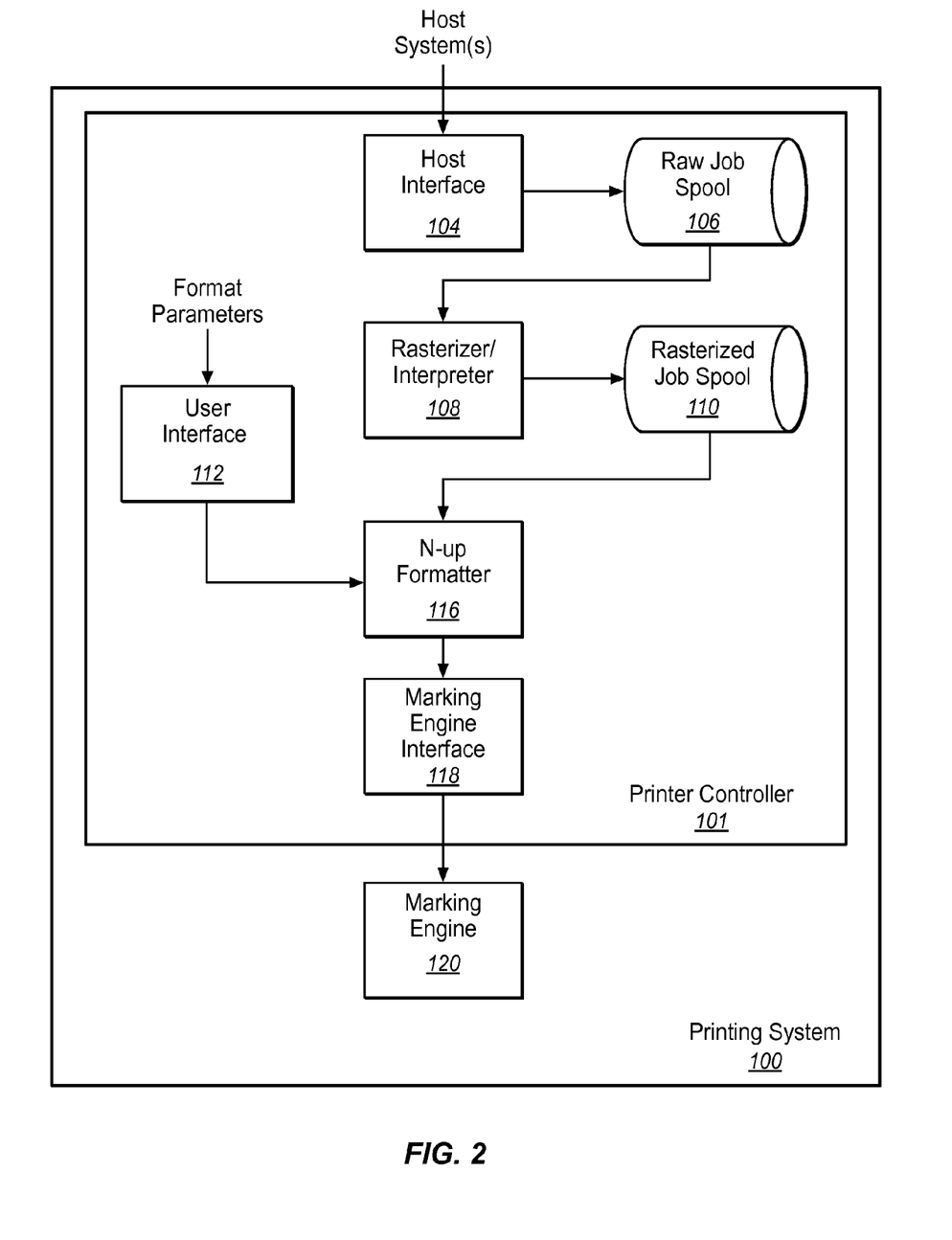
FIG. 2 is a block diagram of a printing system that provides enhanced N-up printing via page inclusion objects in another exemplary embodiment of the invention.

FIG. 2 is a block diagram of the printing system 100 in another exemplary embodiment of the invention. As mentioned, the printing system 100 may be coupled to one or more host systems for receiving raw print jobs therefrom and for imprinting the raw print jobs on two-sided medium 113. The printing system 100 may utilize pre-cut sheets of paper or may use paper in the form of continuous feed (e.g., fanfold of rolls of paper).

The printing system 100 may generally include printer controller 101 for controlling overall operation of the printing system 100. Printer controller 101 is generally responsible for interfacing with the host system via the host interface 104 to receive raw print jobs. The host interface 104 couples the printing system 100 through the printer controller 101 to various host systems through any of several well-known protocols and associated communication media including, for example, IBM channel connections, high speed parallel bus structures, high speed serial communications, etc.

Raw print jobs received in the printer controller 101 are applied through raw job spool 106 to a rasterizer/interpreter 108. The rasterizer/interpreter 108 represents features within the printer controller 101 for interpreting the page description language or other command language used for encoding raw print jobs. For example, PostScript, HP PCL, and other page description languages may be used to encode the data to be imprinted on the printable medium. In addition, the rasterizer/interpreter 108 may include simpler interpreters intended for decoding simple ASCII or EBCDIC encoded textual information largely devoid of page layout or page formatting features. Those of ordinary skill in the art will recognize that a plurality of such rasterizers/interpreters 108 may be provided in accordance with the needs of any particular application for providing one or more page description language encoding features. Many present day printing systems include at least PostScript and HP PCL as two available page description languages for encoding raw print jobs. In general, the rasterizer/interpreter 108 interprets the language of the received print jobs and generates corresponding logical pages representing the imprinted page images of the received raw print jobs. Each logical page generated by the rasterizer/interpreter 108 is represented as a two-dimensional array of pixels where each pixel is a value indicating the color and/or intensity of the corresponding pixel.

The logical pages generated by the rasterizer/interpreter 108 are provided as a rasterized print job through the rasterized job spool 110 and the N-up formatter 116. The N-up formatter 116 positions the logical pages of a rasterized print job in accordance with certain print parameters for imaging on sheets of paper. The N-up formatter 116 forwards the formatted images to a marking engine 120 through the marking engine interface 118. The marking engine 120 then affixes the pixels of the formatted pages onto the printable medium to generate the final printed sheets. The marking engine 120 (also commonly referred to as printing engines or imaging engines) may affix or mark pixels on paper using liquid or dry toning/inking materials applied via mechanical, electrostatic, and/or electrophotographic means.

In accordance with features and aspects hereof, the N-up formatter 116 may receive a rasterized print job from the rasterized job spool 110. An operator of the printing system 100 may then prepare the print job for printing by formatting a rasterized logical page of the print job. Such formatting generally includes positioning, sizing, and/or rotation of the logical pages. The operator may do so by entering format parameters through the user interface 112 to direct the N-up formatter 116 to generate one or more page inclusion objects such that one or more logical pages are positioned therein. The format parameters may also be used to direct the N-up formatter 116 to position, size, and/or rotate the page inclusion objects at user-defined locations on a sheet of tangible medium 110. Examples of logical page/page inclusion object positioning, sizing, and rotation are illustrated in FIGS. 3 and 4.

In one embodiment, the printing system 100 is operable within the Advanced Function Presentation (AFP) architecture. AFP is a family of associated printer software, firmware, and hardware that provides document and information presentation control independent of specific applications and devices. AFP is maintained by the AFP Consortium. AFP consists of MO:DCA (Mixed Object:Document Content Architecture), which is a "Page Description Language" (PDL) file format that describes text and graphics on a page. "Mixed Object" generally regards the fact that an AFP data stream (AFPDS) can contain multiple types of objects, including text and images and is generally comparable to PDF or PostScript. AFP may also employ IPDS (Intelligent Printer Data Stream). IPDS is a bi-directional protocol used between the host and the printer to send page level data. IPDS may also be used to signal errors and print job completions. Those skilled in the art, however, should readily recognize that the invention is not intended to be limited to any particular N-up printing architecture or printer control language.

Figure 3:
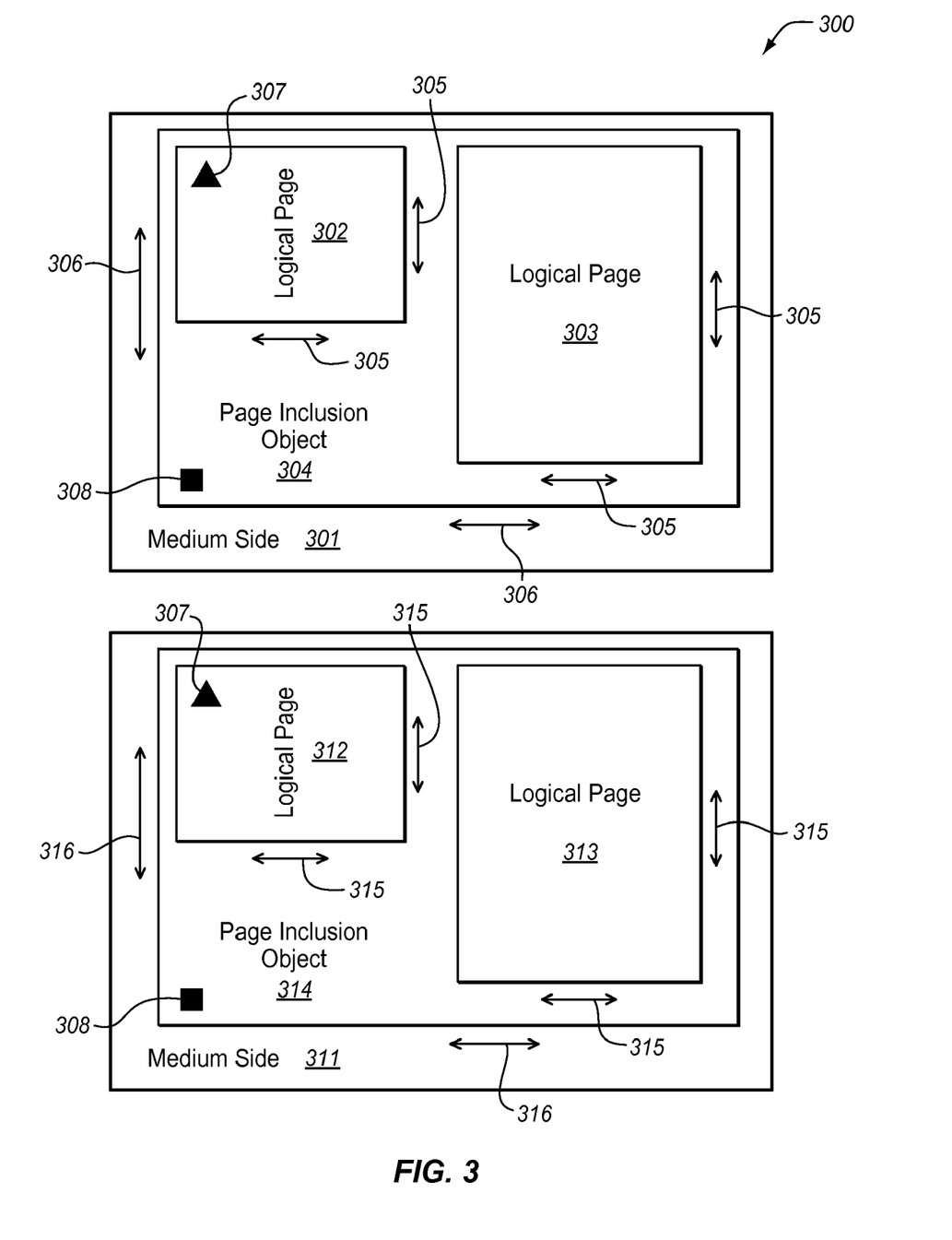
FIGS. 3-5 illustrate exemplary print layouts that include page inclusion objects and logical pages generated by an N-up printing system.
Figure 4:
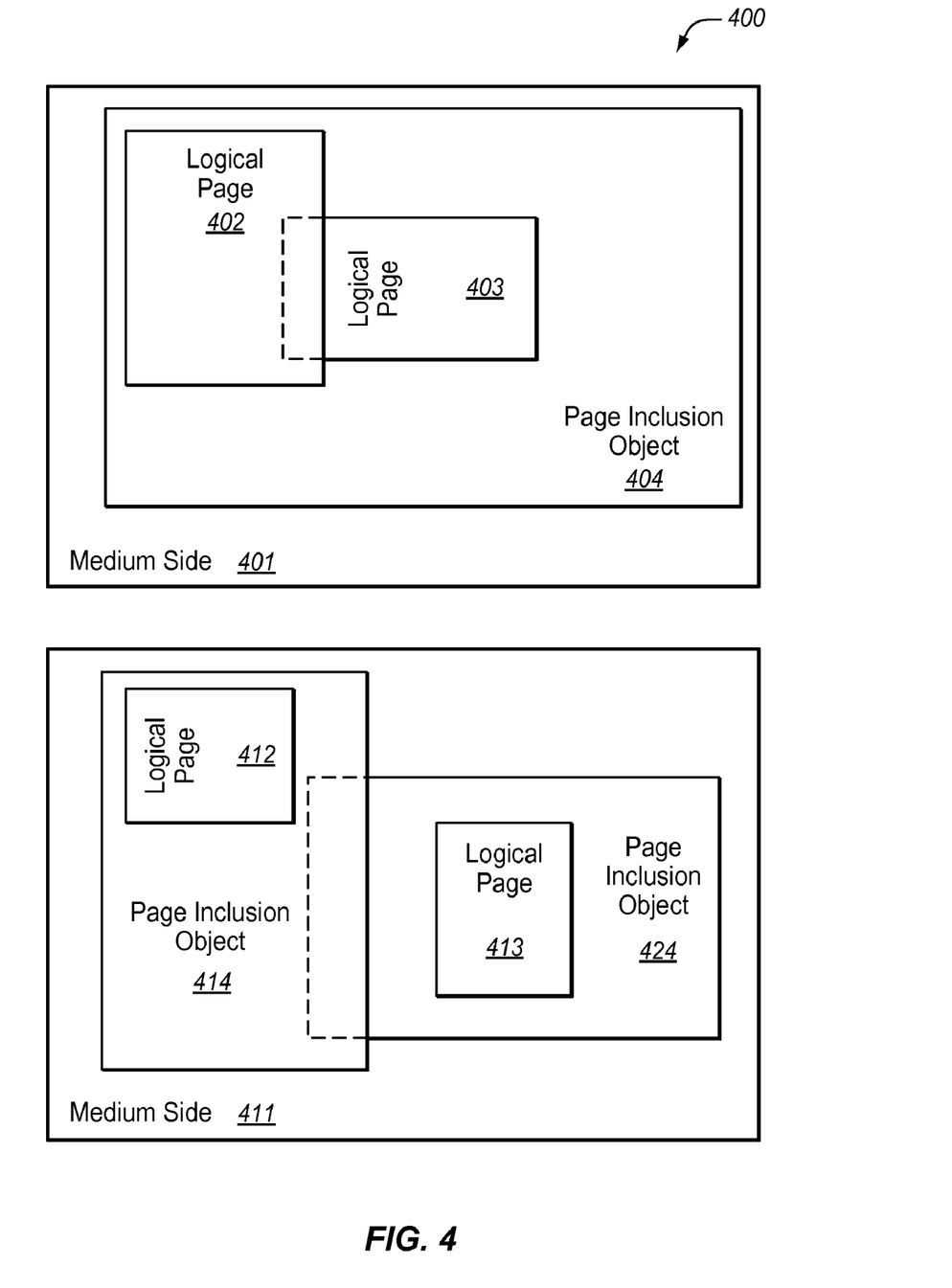

FIGS. 3 and 4 illustrate exemplary print layouts that include page inclusion objects and logical pages generated by an N-up printing system. For example, FIG. 3 illustrates a sheet of tangible medium 300 having medium sides 301 and 311. In this embodiment, each medium side (301 and 311) is configured with a page inclusion object (304 and 314, respectively). The flexible nature of the N-up formatter 116 allows the printing system operator to position, rotate, and/or size the logical pages within the page inclusion object. To illustrate, the page inclusion object 304 illustrates a logical page 302 rotated at a 90° angle with respect to the logical page 303. In one embodiment, the logical pages 302 and 303 are rotatable at 90° increments, such as 0°, 90°, 180°, and 270° primarily to simplify the number of permutations; however, any angle of rotation may be used. The flexible positioning and rotation is also available with the page inclusion objects 304 and 314, as well as the logical pages 303, 312, and 313.

Also illustrated with the medium side 301 are the positioning/sizing arrows 305. The positioning arrows 305 are intended to indicate the capability of selectively positioning and/or sizing logical pages within the page inclusion object 304. For example, a user may configure the N-up formatter 116 to position and/or size the logical page 303 within the page inclusion object 304 by entering dimension parameters through the user interface 112 via the PDL of the printing system 100. Similarly, the positioning/sizing arrows 306 are intended to indicate the capability of selectively positioning and/or sizing the page inclusion object 304. Such may also be done by entering dimension parameters through the user interface 112. The logical pages 312 and 313 have similar positioning/sizing arrows 315 indicating the selective positioning and/or sizing capabilities of the logical pages within the page inclusion object 314. The positioning/sizing arrows 316 similarly indicate the selective positioning and/or sizing capabilities of the page inclusion object 314.

In one embodiment, the logical pages may be associated with one another such that the logical pages print at corresponding locations on the medium sides 301 and 311. For example, the logical page 302 may be linked to the logical page 312 as indicated by the association indicator 307. Such may be performed by entering dimension parameters for the logical page 302 via the user interface 112 and linking those parameters to the logical page 312. The logical pages 302 and 312 may thereby be configured to print in a duplex format. To provide one example, a book typically has printed text on front and back sides of each page. By associating the logical pages 302 and 312, printed text from pages in a book may be positioned so that they appear as pages of a book on each medium side 301 and 311. Generally, however, books are printed with four pages on a sheet of tangible medium with two pages on one side of the tangible medium and two pages on the opposing side. Multiple sheets of tangible medium are then laid upon one another and folded into "booklets" before they are bound.

Similarly, the page inclusion objects themselves may be associated with one another. Other embodiments may even have the page inclusion object configured as a single logical page container capable of printing on the front and back sides of a sheet of tangible medium. In this regard, the page inclusion object, or sheetlet, may have one or more logical pages configured within the boundaries of the page inclusion object on each side of the sheet of tangible medium.

The flexible formatting of the inventive concepts described herein may be advantageously employed to perform such printing, while also formatting other logical pages of the print job. For example, logical pages 302 and 312 may each represent two pages of a book whereas logical pages 303 and 313 represent advertising flyers for that book. Once printed, the sheet of tangible medium 300 may be folded and/or cut as needed. To this end, the sheet of tangible medium 300 may be cut such that logical pages 303 and 313 may be printed as duplex copies of the advertisement. The logical pages 302 and 312, on the other hand, may be cut and laid upon other sheets of tangible medium to form booklets for subsequent binding. This flexible formatting of multiple print jobs may reduce waste as a result of cutting from a uniform continuous feed of tangible medium or at least reduce the burden associated with pre-configuring continuous feeds of tangible medium for the printing system.

Moreover, the positioning features may be used to overcome problems associated with "creep". Creep in printing generally refers to the changing location of printed text within a page of a booklet as the booklet is bound. That is, as sheets of paper are laid upon one another and folded in half, the physical thickness of the paper causes the ends of the pages within the booklet to be uneven. Generally, the sheets of paper are cut to account for creep. However, if the printed text is not accounted for, creep will cause the printed text to appear at different locations on a page to page basis, with the most noticeable differences in location being found between the first and center pages. Formatting parameters may be input to the N-up formatter 116 to automatically take into account the page thickness and remove creep.

The page association functionality of the N-up formatter 116 is not limited to the logical pages. Rather, page inclusion objects 304 and 314 may also be linked as desired by the printing system operator and/or as required by the print job, as illustrated with the association indicators 308. Such may provide even more flexibility to the printing system operator.

FIG. 4 illustrates other flexible print layouts available to a sheet of tangible medium 400. For example, the medium side 401 illustrates a page inclusion object 404 having two logical pages 402 and 403 rotated at 90° with respect to one another. In this embodiment, the logical page 402 is illustrated as overlapping the logical page 403 within the page inclusion object 404. An example of this advantageous flexibility can be found when the printing system operator desires an overlay of a digital watermark onto a page of printed text and/or an image. Another example can be found when portions of a print job can be "cut down" when space in a logical page is unoccupied. That is, unused space of one logical page can be covered by another logical page so as to take advantage of as much tangible medium real estate as possible.

Medium side 411 illustrates a similar flexibility with the overlapping of the page inclusion objects 414 and 424. In this embodiment, the page inclusion object 414 is illustrated with the logical page 412 and the page inclusion object 424 is illustrated with the logical page 413. This embodiment is merely intended to show the flexible nature of the inventive print layout and formatting concepts described herein. Moreover, none of the embodiments shown and described in FIGS. 3 and 4 should be limited to the number of logical pages and page inclusion objects. Rather, a page inclusion object may include virtually any number of logical pages positioned, sized, and/or rotated anywhere within the page inclusion object. Page inclusion objects themselves may also be similarly configured for print within the boundaries of the sheet of tangible medium.

Figure 5:
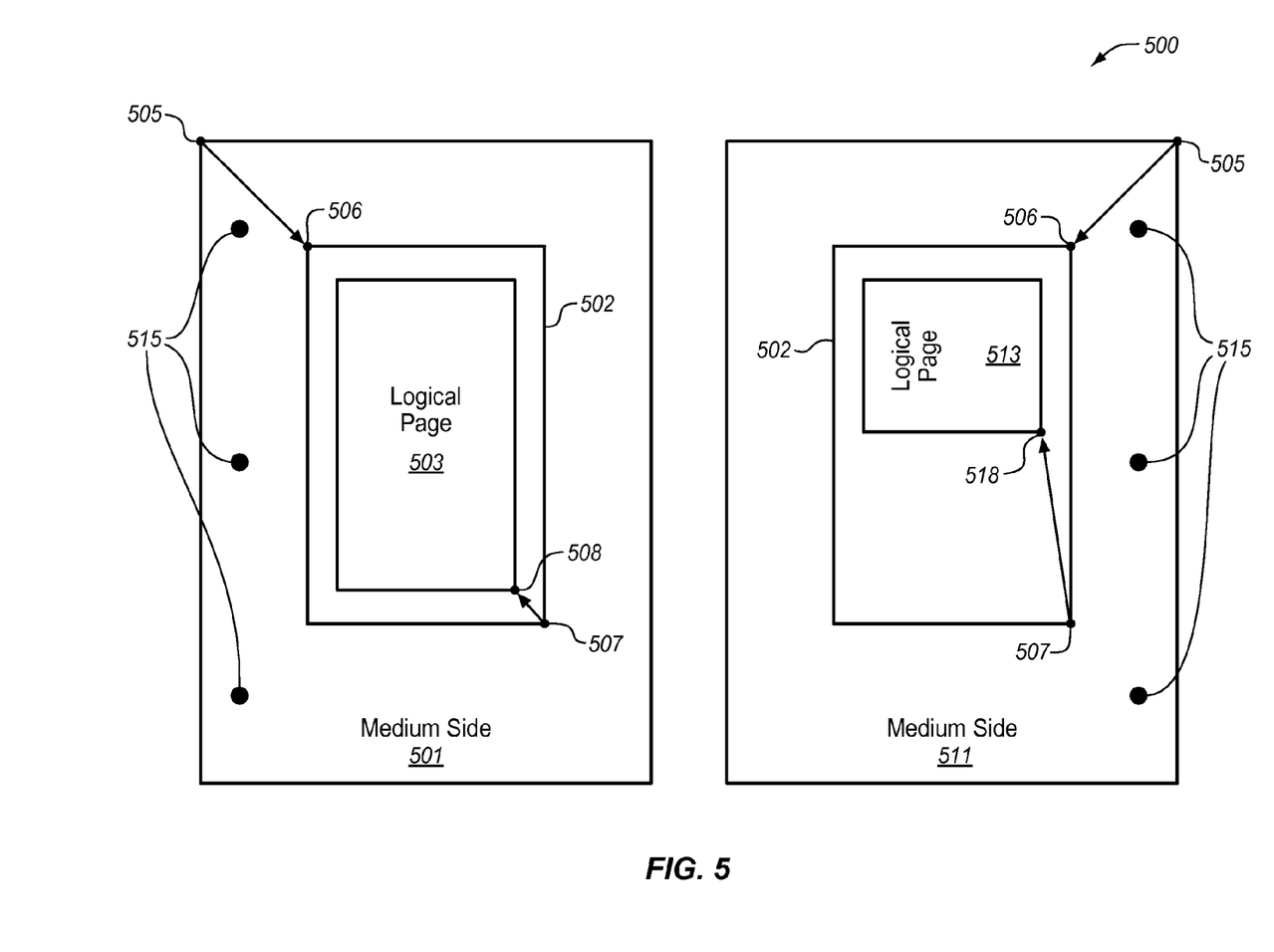

FIG. 5 illustrates another flexible print layout available to a sheet of tangible medium 500. In this embodiment, a sheetlet 502, or page inclusion object, is positioned on a medium side 501 at a point of 506 from the "origin" 505 of the tangible medium 500. The medium sides 501 and 511 respectively represent the front and back sides of the tangible medium 500, as indicated by the three-hole punch 515. Thus, the sheetlet 502, in this embodiment, may be considered as a single page inclusion object having front and back sides. The logical pages 503 and 513 may be positioned within the boundaries of the sheetlet 502 on the medium sides 501 and 511, respectively, such that the logical pages 503 and 513 print the sheetlet 502 in a duplex mode.

The logical pages 503 and 513 may be positioned at different locations with respect to the origin 507 of the sheetlet 502. For example, the logical page 503 is positioned at a point 508 from the sheetlet origin point 507 whereas the logical page 513 is positioned at a point 518 from the sheetlet origin point 507. The logical pages 503 and 513 are also positioned within the sheetlet 502 with differing rotations. However, the invention is not intended to be limited to any particular position and/or rotation of logical pages within the sheetlet 502. Once configured within the confines of the sheetlet 502, the logical pages 503 and 513 are generally "locked" into the sheetlet 502. Accordingly, repositioning of the logical pages 503 and 513 with respect to the medium sides 501 and 511 occurs when the sheetlet 502 is repositioned with respect to the origin 505 of the tangible medium 500.

Alternatively, the logical pages 503 in 513 may be positioned at the same locations with respect to the origin 507 of the sheetlet 502. For example, the logical pages 503 and 513 may represent pages of a book that are intended to be read continuously by reading the medium side 501 first and then flipping over to the medium side 511. Thus, the logical pages 503 and 513 may best be read when they are located at the same position within the sheetlet 502.

Figure 6:
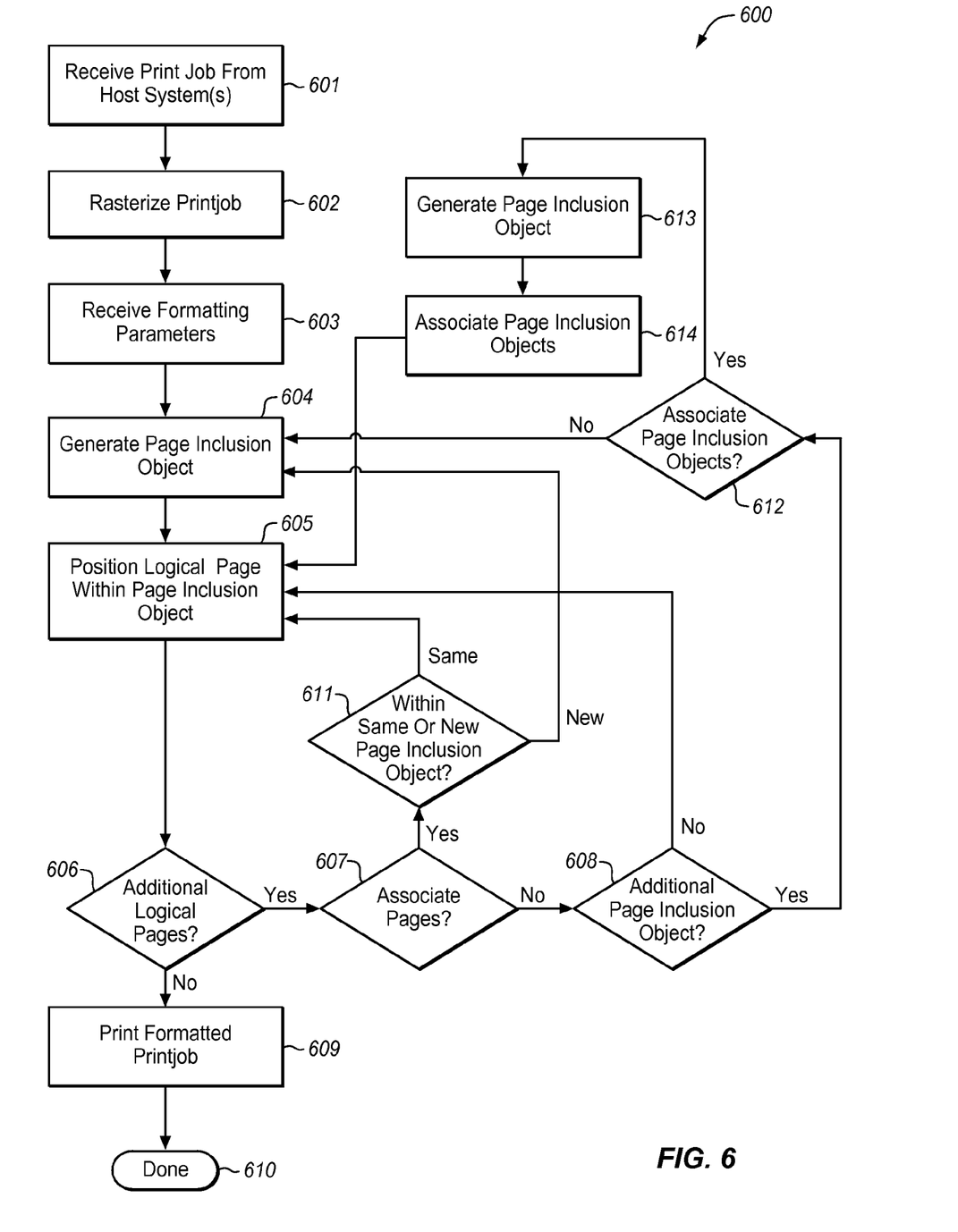
FIG. 6 is a flowchart illustrating a method of preparing an N-up print job with page inclusion objects in one exemplary embodiment of the invention.

FIG. 6 is a flowchart illustrating a method 600 of preparing an N-up print job with page inclusion objects in one exemplary embodiment of the invention. The method 600 initiates when the printing system 100 receives a print job from a host system, in step 601. Generally, the printing system 100 may be communicatively coupled to a plurality of host systems so as to receive multiple print jobs. In any case, the print jobs may be configured with a plurality of logical pages that include various arrangements of text, data, and/or images. The print jobs may be transferred to the printing system 100 as a print datastream, such as the AFP datastream described above. In step 602, the rasterizer 108 rasterizes the print job to convert those logical pages to rasterized logical pages, such as bitmap images.

In step 603, the N-up formatter 116 receives format parameters that are used to generate a page inclusion object. For example, the printing system operator may input position, sizing, and/or rotation parameters to the N-up formatter 116 via the user interface 112. The N-up formatter 116 may use these formatting parameters to generate a page inclusion object in step 604 that is used to digitally contain logical pages. The formatting parameters may direct the N-up formatter 116 to position, size, and/or rotate the page inclusion object for application to a sheet side of the tangible medium, such as the side of a sheet of paper. To position the logical page within the page inclusion object, the printing system operator may input formatting parameters via the user interface 112 that direct the N-up formatter 116 to position the rasterized logical page as desired. Generally, any number of logical pages may be included in the page inclusion object. Thereafter, in step 605, the N-up formatter 116 positions a rasterized logical page within the page inclusion object.

The N-up formatter 116 determines, in step 606, the number of pages to be included with the page inclusion object. For example, if the print job has multiple logical pages, the printing system operator may desire customized placement of the logical pages. In such case, a determination may be made regarding the association of the logical pages, in step 607. That is, if multiple logical pages are included in the print job, the logical pages may be assigned to opposite sides of a sheet of tangible medium. The printing system operator may then input placement parameters that position a first logical page within a page inclusion object for printing on a first side of the sheet of tangible medium. The printing system operator may then associate a second logical page such that the second logical page prints at essentially the same location on the opposite side of the sheet of tangible medium. In this regard, a decision may be made as to whether the logical pages are to be associated with the same or a new page inclusion object, in step 611. If the logical pages are to be associated within a new page inclusion object, the N-up formatter 116 generates a second page inclusion object in step 604 and positions the second logical page within that page inclusion object, in step 605. Alternatively, if the logical pages are to be associated within the same page inclusion object, the N-up formatter 116 positions a logical page within the same inclusion object as desired, in step 605.

If, however, no association of logical pages is required, the N-up formatter 116 determines in step 608 whether an additional page inclusion object is desired. If no additional page inclusion objects are desired, the method 600 returns to step 604 such that the N-up formatter 116 may position the additional logical pages within the original page inclusion object. Otherwise, the method 600 may proceed to step 612 to determine whether the page inclusion objects themselves should be associated with one another. For example, logical pages may be associated with one another on the front and back sides of a sheet of tangible medium. The page inclusion objects themselves may be similarly associated with one another. Thus, if a determination is made to associate the page inclusion objects, the N-up formatter 116 generates a new page inclusion object in step 613 and associates the page inclusion objects in step 614. Thereafter, the method 600 returns to step 605 to position the logical page within the new page inclusion object. If, however, no association is required between the page inclusion objects, the method 600 returns to step 604 such that the N-up formatter 116 may generate an additional page inclusion object.

Once all of the formatting regarding the generation of desired page inclusion objects and the positioning of logical pages therein is complete, the method proceeds to step 609 where the N-up formatter 116 transfers the formatted rasterized print job to the marking engine interface 118 and thus to the marking engine 120 to print the formatted print job. The method 600 ends in step 610 after the print job is printed.

Those skilled in the art should readily recognize that the invention is not intended to be limited to the specific arrangement of steps illustrated in the method 600. Rather, the steps involved in the method 600 may be arranged in other ways that fall within the scope and spirit of the invention. For example, other embodiments may have a page inclusion object that is two-sided in nature, representative of the front and back sides of a subsection of a sheet of tangible medium. Accordingly, the association of the logical pages may be performed within the page inclusion object regardless of a determination as to whether page inclusion objects require association.

Figure 7:
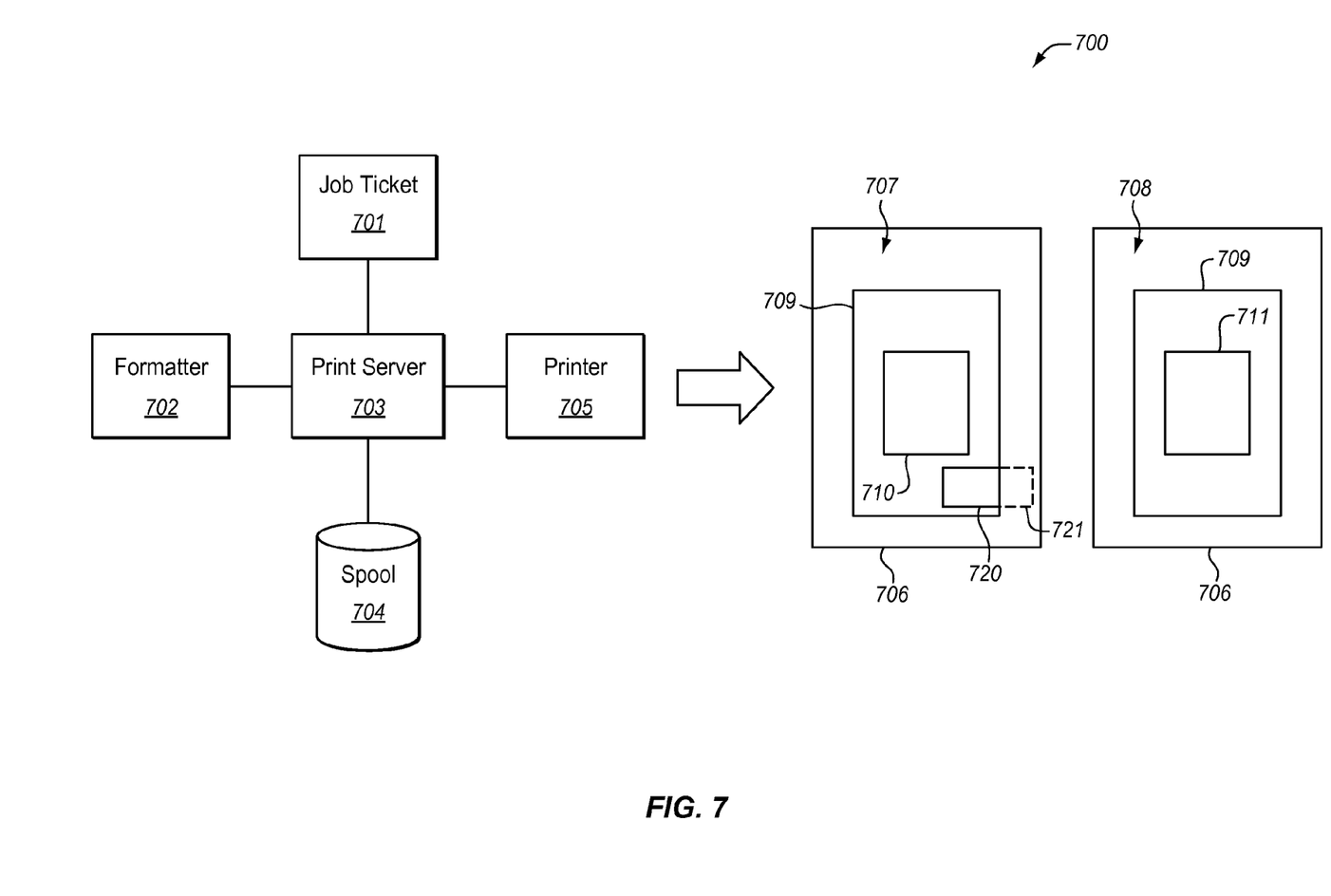
FIG. 7 is a block diagram of another printing system that provides enhanced N-up printing via sheetlets in one exemplary embodiment of the invention.

FIG. 7 is a block diagram of another printing system 700 that provides enhanced N-up printing via sheetlets, such as sheetlet 709, in one exemplary embodiment of the invention. In this regard, the printing system 700 is configured with a print server 703 that receives a print job in the form of a job ticket 701 that is spooled within the print spool 704 until the print job can be printed by the printer 705. The job ticket 701 includes format definitions or parameters that are used to arrange the printing of the logical pages 710 and 711 on the first and second sides 707 and 708 of the tangible medium 706. The formatter 702 uses the format parameters to prepare the logical pages 710 and 711 for printing. These format parameters may also include information pertaining to the sheetlet 709 in which the logical pages 710 and 711 are configured.

In a print data stream, a user may specify sheetlet-based page placement printing and define one or more sheetlet format parameters to generate the sheetlet 709. Generally, the sheetlet 709 is logically treated as if it were an actual sheet, such as the sides 707 and 708 of the tangible medium 706. Since the sheetlet 709 is treated as if it were an actual sheet, page data of the logical pages 710 and 711 is not printed outside the boundaries of the sheetlet 709. An example of such is illustrated with the placement of logical page 720 having a section 721 outside the boundaries of the sheetlet 709. While the portion of the logical page 720 within the sheetlet 709 may still be viewable upon printing, the portion 721 is not viewable upon printing.

To implement sheetlet-based page placement printing, a new parameter may be added to the PDL used by the printing system 700. For example, a new parameter may be added to the various AFP data stream architectures (e.g., MO:DCA and IPDS), PCL, PDF, or the like to invoke sheetlet-based page placement. The PDL may specify individual page placement, orientation, and positioning with respect to the sheetlet's origin in the same manner as typical logical page placement. In this regard, the PDL may have defined placement codes and structures, called sheetlet descriptors. A sheetlet descriptor may include formatting parameters that define one or more areas on both sides 707 and 708 of the sheet of tangible medium 706.

The formatting parameters may also include a sheetlet identifier, a unit of measure, a size of the sheetlet 709 in the horizontal direction, a size of the sheetlet 709 in the vertical direction, the horizontal coordinate of the sheetlet 709 origin, and the horizontal coordinate of the sheetlet 709 origin that a user may employ to specify the dimensions of the sheetlet to be printed. For example, the user may prepare and format a print job by invoking the sheetlet-based printing and then entering the formatting parameters within the job ticket 701 using a host computer system. In this embodiment, a single sheetlet 709 is shown having two logical pages 710 and 711 on the first and second sides of the sheetlet. However, the invention is not intended to be so limited. Rather, multiple sheetlets and/or logical pages may be configured to print on the sheet of tangible medium 706. Examples of such various sheetlet and logical page configurations are shown above in FIGS. 3-5.

Although specific embodiments were described herein, the scope of the invention is not limited to those specific embodiments. The scope of the invention is defined by the following claims and any equivalents thereof.

We claim:

1. An N-up printing system adapted to receive a print job from a host system for printing to a tangible medium, wherein the print job comprises a first logical page, the printing system comprising:
    an N-up formatter interface adapted to receive formatting parameters; and
    an N-up formatter communicatively coupled to the N-up formatter interface and adapted to generate a first page inclusion object based on the formatting parameters, wherein the N-up formatter is further adapted to input the first logical page to the first page inclusion object and position the first logical page within the first page inclusion object,
    wherein the print job comprises a second logical page and the N-up formatter is further adapted to generate a second page inclusion object based on the received formatting parameters,
    wherein the second page inclusion object is adapted to digitally include one or more logical pages,
    wherein the N-up formatter is further adapted to position the second logical page within the second page inclusion object and position the second page inclusion object to print on a second sheet side of the tangible medium, and
    wherein the N-up formatter is further adapted to associate the first page inclusion object with the second page inclusion object to respectively print on the first and second sheet sides of the tangible medium at corresponding locations.

2. The N-up printing system of claim 1, wherein the N-up formatter is further adapted to associate the first logical page with the second logical page to respectively print on the first and second sheet sides of the tangible medium at corresponding locations.

3. The N-up printing system of claim 1, wherein the print job comprises a third logical page and wherein the N-up formatter is further adapted to position the third logical page within the first page inclusion object.

4. The N-up printing system of claim 3, wherein the N-up formatter is further adapted to position the third logical page within the first page inclusion object by overlapping the third logical page on the first logical page within the first page inclusion object.

5. The N-up printing system of claim 1, wherein the print job comprises a third logical page and wherein the N-up formatter is further adapted to generate a third page inclusion object, wherein the third page inclusion object is adapted to include one or more logical pages, and wherein the N-up formatter is further adapted to position the third logical page within the third page inclusion object and position the third page inclusion object for printing to the first sheet side of tangible medium.

6. The N-up printing system of claim 5, wherein the N-up formatter is further adapted to overlap the third page inclusion object on the first page inclusion object.

7. The N-up printing system of claim 1, wherein the N-up formatter is further adapted to position the first logical page within the first page inclusion object by rotating the first logical page at an incremental angle of 90°.

8. The N-up printing system of claim 1, wherein the N-up formatter is further adapted to position the first page inclusion object for printing to a first sheet side of the tangible medium by rotating the first page inclusion object at an incremental angle of 90°.

9. The N-up printing system of claim 1, wherein the print job comprises a third logical page and wherein the N-up formatter is further adapted to generate a third page inclusion object, position the third logical page within the third page inclusion object, position the third page inclusion object to print on the second sheet side of tangible medium, and automatically compensate for creep in subsequent sheets of the tangible medium by automatically repositioning the first and third page inclusion objects of subsequent sheets of the tangible medium, wherein the third page inclusion object is adapted to digitally include one or more logical pages.

10. A method operable within a printer controller associated with at least one print engine for printing N-up print jobs, the method comprising:
    receiving a print job that comprises a first logical page;
    rasterizing the print job for printing on a first sheet side of a tangible medium;
    receiving formatting parameters to generate a first page inclusion object in response to rasterizing, wherein the first page inclusion object is adapted to digitally include one or more logical pages;
    generating the first page inclusion object based on the received formatting parameters;
    positioning the first logical page within the first page inclusion object; and
    printing the print job with the first page inclusion object on the first sheet side of the tangible medium,
    wherein the print job comprises a second logical page and the method further comprises:

generating a second page inclusion object based on the received formatting parameters, wherein the second page inclusion object is adapted to digitally include one or more logical pages;

positioning the second logical page within the second page inclusion object;

positioning the second page inclusion object to print on a second sheet side of the tangible medium, and associating the first page inclusion object with the second page inclusion object to respectively print on the first and second sheet sides of the tangible medium at corresponding locations.

11. The method of claim 10, further comprising associating the first logical page with the second logical page to respectively print on the first and second sheet sides of the tangible medium at corresponding locations.

12. The method of claim 10, wherein the print job comprises a third logical page and wherein the method further comprises positioning the third logical page within the first page inclusion object.

13. The method of claim 12, wherein positioning the third logical page within the first page inclusion object comprises overlapping the third logical page on the first logical page within the first page inclusion object.

14. The method of claim 10, wherein the print job comprises a third logical page and wherein the method further comprises:

generating a third page inclusion object, wherein the third page inclusion object is adapted to include one or more logical pages;

positioning the third logical page within the second third page inclusion object; and positioning the third page inclusion object to print on the first sheet side of tangible medium.

15. The method of claim 14, further comprising overlapping the third page inclusion object on the first page inclusion object.

16. The method of claim 10, wherein positioning the first logical page within the first page inclusion object includes rotating the first logical page at an incremental angle of 90°.

17. The method of claim 10, further comprising positioning the first page inclusion object for printing to a first sheet side of the tangible medium by rotating the first page inclusion object at an incremental angle of 90°.

18. The method of claim 10, wherein the print job comprises a third logical page and wherein the method further comprises:

generating a third page inclusion object, wherein the third page inclusion object is adapted to digitally include one or more logical pages;

positioning the third logical page within the third page inclusion object;

positioning the third page inclusion object to print on the second sheet side of tangible medium; and automatically compensating for creep in subsequent sheets of the tangible medium by automatically repositioning the first and third page inclusion objects on subsequent sheets of the tangible medium.

19. An N-up printing system adapted to receive a print job from a host system for printing to a tangible medium, wherein the print job comprises at least first and second logical pages, the N-up printing system comprising:

an N-up formatter adapted to format the logical pages of the print job by generating at least first and second page inclusion objects, inputting the first logical page to the first page inclusion object, inputting the second logical page to the second page inclusion object, and linking the first and second logical pages to respectively print on first and second sheet sides of a tangible medium at corresponding locations; and an N-up formatter interface communicatively coupled to the N-up formatter to receive formatting parameters that direct the N-up formatter to generate said at least first and second page inclusion objects.

20. The N-up printing system of claim 19, wherein the N-up formatter is further adapted to rotate the first logical page within the first page inclusion object.

21. The N-up printing system of claim 19, wherein the N-up formatter is further adapted to rotate the first page inclusion object with respect to the first sheet side of the tangible medium.

22. The N-up printing system of claim 19, wherein the N-up formatter is further adapted to size the first logical page within the first page inclusion object.

23. The N-up printing system of claim 19, wherein the N-up formatter is further adapted to size the first page inclusion object with respect to the first sheet side of the tangible medium.

24. An N-up printing system comprising:

a print engine adapted to apply rasterized images to a tangible medium; and a printer controller coupled to the print engine for transferring rasterized images to the print engine, the printer controller comprising:

a host interface for receiving a print job from an attached host system;

a print job rasterizer communicatively coupled to the host interface and adapted to generate a rasterized print job from the received print job, wherein the rasterized print job comprises a plurality of logical pages;

an N-UP formatter adapted to format the logical pages of the rasterized print job into an N-UP rasterized print job by generating at least one page inclusion object, inputting a first of the plurality of logical pages to the first page inclusion object, and positioning and sizing the first logical page within the first page inclusion object; and an N-up formatter interface communicatively coupled to the N-up formatter to receive formatting parameters that direct the N-up formatter to generate said at least one page inclusion object, wherein the N-up formatter is further adapted to generate a second page inclusion object and associate the first and second page inclusion objects on respective first and second sheet sides of the tangible medium.

25. The N-up printing system of claim 24, wherein the N-up formatter is further adapted to associate the first and second logical pages on respective first and second sheet sides of the tangible medium.

* * * * *

UNITED STATES PATENT AND TRADEMARK OFFICE
CERTIFICATE OF CORRECTION

| | | |
|---|---|---|
| PATENT NO. | : 8,248,652 B2 | Page 1 of 1 |
| APPLICATION NO. | : 12/134468 | |
| DATED | : August 21, 2012 | |
| INVENTOR(S) | : Wardell et al. | |

It is certified that error appears in the above-identified patent and that said Letters Patent is hereby corrected as shown below:

In column 13, lines 25-34, the text "14. The method of claim 10, wherein the print job comprises a third logical page and wherein the method further comprises: generating a third page inclusion object, wherein the third page inclusion object is adapted to include one or more logical pages; positioning the third logical page within the second third page inclusion object; and positioning the third page inclusion object to print on the first sheet side of tangible medium"

should read

-- 14. The method of claim 10, wherein the print job comprises a third logical page and wherein the method further comprises: generating a third page inclusion object, wherein the third page inclusion object is adapted to include one or more logical pages; positioning the third logical page within the third page inclusion object; and positioning the third page inclusion object to print on the first sheet side of tangible medium --

Signed and Sealed this
Eighteenth Day of December, 2012

David J. Kappos
*Director of the United States Patent and Trademark Office*